(12) United States Patent
Basset et al.

(10) Patent No.: US 9,764,728 B2
(45) Date of Patent: Sep. 19, 2017

(54) ELECTRIC VEHICLE

(71) Applicant: Mahle International GmbH, Stuttgart (DE)

(72) Inventors: Mike Basset, Northamptonshire (GB); Tony Cains, Northamptonshire (GB); Jonathan Hall, Northamptonshire (GB); Marco Warth, Schorndorf (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/433,584

(22) PCT Filed: Oct. 4, 2013

(86) PCT No.: PCT/EP2013/070672
§ 371 (c)(1),
(2) Date: Apr. 3, 2015

(87) PCT Pub. No.: WO2014/053620
PCT Pub. Date: Apr. 10, 2014

(65) Prior Publication Data
US 2015/0203094 A1 Jul. 23, 2015

(30) Foreign Application Priority Data

Oct. 5, 2012 (DE) .................. 10 2012 218 173

(51) Int. Cl.
*B60W 20/00* (2016.01)
*B60W 10/06* (2006.01)
(Continued)

(52) U.S. Cl.
CPC .............. *B60W 20/10* (2013.01); *B60K 6/46* (2013.01); *B60L 11/02* (2013.01); *B60L 11/126* (2013.01);
(Continued)

(58) Field of Classification Search
CPC ...... B60W 20/10; B60W 10/06; B60W 10/08; B60L 11/02; B60K 6/46
(Continued)

(56) References Cited

U.S. PATENT DOCUMENTS 6,202,776 B1 3/2001 Masberg et al.
6,405,701 B1 * 6/2002 Masberg ................ B60K 6/485
123/192.1
(Continued)

FOREIGN PATENT DOCUMENTS

DE 19532129 A1 3/1997
DE 19532135 A1 3/1997
(Continued)

OTHER PUBLICATIONS

International Search Report for PCT/EP2013/070672.
(Continued)

*Primary Examiner* — Redhwan K Mawari
*Assistant Examiner* — Anshul Sood
(74) *Attorney, Agent, or Firm* — Fishman Stewart PLLC

(57) ABSTRACT

An electric vehicle may include at least one motor configured to transmit a drive output. A motor-generator unit may be configured to supply the at least one motor with electrical power. The motor-generator unit may include an internal combustion piston engine, which may include a crankshaft configured to rotation about an axis of rotation, and an electrical generator that may be drive connected to the piston engine. A control device may be in communication with the motor-generator unit. The control device may be configured to vary a generator torque of the electrical generator during a rotation cycle of the crankshaft in response to a crankshaft angle.

20 Claims, 3 Drawing Sheets

(51) Int. Cl.
*B60W 10/08* (2006.01)
*B60W 20/10* (2016.01)
*F02D 29/06* (2006.01)
*B60L 11/12* (2006.01)
*B60L 15/20* (2006.01)
*B60K 6/46* (2007.10)
*B60L 11/02* (2006.01)

(52) U.S. Cl.
CPC ............. *B60L 15/20* (2013.01); *B60W 10/06* (2013.01); *B60W 10/08* (2013.01); *F02D 29/06* (2013.01); *B60L 2240/423* (2013.01); *B60L 2240/441* (2013.01); *B60L 2270/145* (2013.01); *Y02T 10/6217* (2013.01); *Y02T 10/645* (2013.01); *Y02T 10/7077* (2013.01); *Y02T 10/72* (2013.01); *Y02T 10/7275* (2013.01); *Y02T 90/16* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 7,523,734 | B2 | 4/2009 | Albertson et al. |
| 2012/0239237 | A1* | 9/2012 | Hashimoto ............ B60K 6/365 701/22 |

FOREIGN PATENT DOCUMENTS

| | | | | |
|---|---|---|---|---|
| DE | 19532163 | A1 | 3/1997 | |
| DE | 102007022201 | A1 | 11/2007 | |
| DE | 102006053057 | A1 | 5/2008 | |
| GB | 2349483 | A * | 1/2000 | ............... B60K 6/46 |
| GB | 2349483 | A | 1/2000 | |

OTHER PUBLICATIONS

German Search Report for DE102012218173A1.
An English Abstract is provided for DE19532163A1.
An English Abstract is provided for DE102006053057A1.

* cited by examiner

ELECTRIC VEHICLE

CROSS-REFERENCE TO RELATED APPLICATIONS

This application claims priority to German Patent Application No. 10 2012 218 173.3, filed Oct. 5 2012, and International Patent Application No. PCT/EP2013/070672, filed Oct. 4, 2013, both of which are hereby incorporated by reference in their entirety.

TECHNICAL FIELD

The present invention relates to a vehicle with an electromotive drive.

BACKGROUND

Electric vehicles, that is, vehicles, in particular road vehicles, having an electromotive drive are generally known. The achievable range of such an electric vehicle is often problematic, since known stores for electrical energy, generally batteries, only have a limited storage capacity. What is known as a range extender can be used for vehicles that are driven exclusively electromotively. Said range extender is an internal combustion engine that is operated with a fuel and drives a generator for generating electrical energy. The respective electromotive drive of the vehicle and the respective battery can then be supplied with the electrical energy generated in this manner. Such a vehicle can also be referred to as a serial hybrid vehicle, since one drive, namely the internal combustion engine, is used to generate energy to supply the other drive, namely the respective electric motor, which is series-connected downstream. Such a range extender can be configured as a unit and therefore corresponds to a motor-generator unit.

Such a motor-generator unit generally comprises a piston engine with internal combustion, that is, an internal combustion engine, and a generator drive-connected thereto for electricity generation. Such a motor-generator unit can be used in a stationary manner to generate electricity, for example on building sites or in the outdoor field. Such a motor-generator unit can likewise be used in a mobile manner, namely in a vehicle. As explained above, use in an electric vehicle in order to increase the range of the electric vehicle as required is of particular interest. Such an electric vehicle comprises at least one electric motor for driving the vehicle. The electrical energy is supplied in principle by means of a battery carried in the vehicle. If this battery is completely discharged, such a motor-generator unit can be used to generate electrical power in order to ensure the electricity supply to the respective electric motor and to charge up the battery of the vehicle again. As mentioned above, such a motor-generator unit is often referred to in such mobile applications as a "range extender".

It is of great importance precisely for such mobile applications that both the piston engine and the generator each have a comparatively low weight so that as little additional mass as possible has to be carried in the respective vehicle. A low weight for the piston engine and the generator entails low inertia masses for the piston engine and generator. This means in the case of the piston engine that each expansion stroke of a cylinder results in a significant acceleration of a crankshaft coupled to the piston. Furthermore, the crankshaft speed decreases again during the two subsequent strokes of the respective piston, namely the exhaust stroke and the induction stroke after that. During the following compression stroke, the crankshaft is also significantly slowed. Moreover, if a load is coupled to the piston engine, in particular in the form of a demand for power from the generator, a generator torque produced by the generator counteracts the engine torque and results in severe slowing of the crankshaft in crankshaft angle ranges in which there is no expansion stroke of a piston. Within a rotation cycle of the crankshaft characterised in that all the pistons connected to the crankshaft have run through each of their working strokes once, this results in a comparatively large difference in rotation speed between a maximum rotation speed and a minimum rotation speed within the respective rotation cycle.

If the crankshaft is drive-connected to a plurality of pistons, the individual acceleration and deceleration processes overlap corresponding to the respective phase shift of the pistons in relation to a crankshaft angle. This means that such a lightweight piston engine produces considerable vibrations. A highly vibrating or oscillating piston engine is however undesirable precisely for electric vehicles or vehicles having a serial hybrid drive, since such an electric vehicle runs extremely quietly during normal driving operation, during which only the at least one electric motor effects the propulsion of the vehicle. Therefore, when the piston engine of a motor-generator unit is switched on as needed, this is very often considered annoying by the users of such electric vehicles, owing to the suddenly perceptible and where applicable audible oscillations and vibrations. The users are often irritated and concerned and incorrectly assume that there is damage to the vehicle.

In order to reduce such vibrations and oscillations in lightweight piston engines, it is in principle possible to couple the crankshaft to a flywheel mass, as a result of which the inertia mass of the piston engine overall can be considerably increased. At the same time, the weight of the entire motor-generator unit increases correspondingly. The costs and the necessary installation space are also increased thereby.

SUMMARY

The present invention is concerned with the problem of specifying an improved embodiment for a vehicle of the above-described type that is equipped with such a motor-generator unit, which in particular has a reduced tendency to oscillate with a low weight.

This problem is solved according to the invention by the subject matter of the independent claims. Advantageous embodiments form the subject matter of the dependent claims.

The invention is based on the general concept of counteracting varying engine torques by means of a dynamically modified or adapted generator torque within a rotation cycle of the crankshaft during which all the pistons each run through all their working strokes once. The invention is based on the consideration that an acceleration of the crankshaft and a deceleration of the crankshaft correlate with the engine torques introduced into the crankshaft via the pistons. Increased engine torques result in an acceleration of the crankshaft, while reduced engine torques result in a deceleration of the crankshaft. The generator torques counteract the engine torques, so high generator torques greatly decelerate the crankshaft, while reduced generator torques slow the crankshaft only a little. According to the invention, the generator torque is varied dynamically and synchronously to the engine torque within a rotation cycle of the crankshaft in such a manner that higher generator torques correspondingly counteract higher engine torques, but when engine torques are low, lower or no generator torques correspondingly counteract them. During the operation of the motor-generator unit, this results in the crankshaft being hindered from accelerating when engine torques are high, but when engine torques are low, the braking generator torques are reduced, as a result of which slowing of the crankshaft takes place only to a reduced extent or not at all in these ranges. In this manner, a rotation speed profile of the crankshaft within its rotation cycle can be made more uniform, as a result of which a distance between a maximum rotation speed of the crankshaft and a minimum rotation speed of the crankshaft within a rotation cycle can be reduced. As a result, the tendency of the piston engine to oscillate and vibrate decreases significantly.

It is in particular possible within the respective rotation cycle, during phases or crankshaft angles in which an increased engine torque prevails, for the latter to be counteracted by a higher generator torque, as a result of which more electrical power can be withdrawn during said phases or angle ranges of the motor-generator unit. This allows the phases or angle ranges during which the generator torque is reduced and less electrical energy can be withdrawn to be compensated. It is in particular possible thereby to withdraw from the motor-generator unit the same amount of electrical energy, averaged over time, as is the case with a constant generator torque at an average level, but the vibration or oscillation behaviour of the motor-generator unit is considerably improved owing to the proposed dynamic actuation of the generator. The variation of the generator torque takes place synchronously to a profile of the engine torque. Since this modification or adaptation of the generator torque takes place within the respective rotation cycle, a dynamic generator torque is present. Since this dynamic adaptation takes place depending on the profile of the engine torque, the dynamic generator torque is synchronised with the engine torque.

According to an advantageous embodiment, the generator torque can be increased when the engine torque increases and reduced when the engine torque decreases within the respective rotation cycle of the crankshaft. In particular, the generator torques counteracting the engine torque are thus increased and reduced synchronously, within the respective rotation cycle. The formulation selected here encompasses both a switching of the generator torque between only two different values and a proportional tracking of the generator torque corresponding to the profile of the engine torque. In principle, any desired stepped adaptations are likewise conceivable.

According to a particularly simple embodiment, it can be provided for the generator to be switched on, in particular at a constant value, to increase the generator torque and switched off to reduce the generator torque. In the switched-off state, the generator produces its smallest counter-torque, which is substantially only determined by its mass inertia and by friction effects. Such dynamic generator control can be implemented particularly simply.

In another embodiment, it can be provided for an electrical power output by the generator to be increased in order to increase the generator torque, while an electrical power output by the generator is reduced in order to reduce the generator torque. For example, in a vehicle application, a charge current that is used to charge up an electric battery can be controlled comparatively simply, as a result of which the electrical power withdrawn at the generator can be controlled.

In another advantageous embodiment, an increased engine torque can be present during an expansion stroke of a piston of the piston engine. If the piston engine has a plurality of pistons, they are usually coupled to the crankshaft with their expansion strokes phase-shifted to the crankshaft angle. The expansion stroke of each cylinder can then result in an increased engine torque. Each expansion stroke usually extends over 180° crankshaft angle. If the individual expansion strokes follow each other immediately, a larger angle range with increased engine torque can also be defined, which can cover for example 360° crankshaft angle with two successive expansion strokes of two different pistons.

For example, a first angle range having an engine torque that is reduced on average and a second angle range having an engine torque that is higher on average can be present within the respective rotation cycle measured in crankshaft angle degrees, the generator torque then being reduced in the first angle range and increased in the second angle range. In particular, the generator can be operated with a constant, reduced engine torque or even switched off in the first angle range, whereas it has or produces a constant, comparatively high generator torque in the second angle range.

In a particularly advantageous embodiment, the generator torque can be varied in correspondence with a profile of the engine torque within the respective rotation cycle. In this case, the generator torque largely follows the variations in the engine torque, it also being possible here for more or less stepped tracking of the generator torque to be implemented depending on the engine torque.

Of particular interest is an embodiment in which the piston engine operates according to the four-stroke principle, so the rotation cycle of its crankshaft is 720° crankshaft angle.

If, according to a preferred development, the piston engine then operates with only two pistons, which can in particular be arranged in series, it can be provided for the two pistons to be drive-connected to the crankshaft in such a manner that the expansion strokes of the two pistons are phase-shifted to each other by 180° crankshaft angle. This means that the first piston executes its expansion stroke in an angle range of 0° to 180°, whereas the second piston executes its expansion stroke in an angle range of 180° to 360°. These two expansion strokes can then be combined in angle terms to form a common angle range extending from 0° to 360° crankshaft angle, within which on average a higher engine torque is present. This would correspond to the second angle range introduced above. The first angle range is then present in a preceding or subsequent angle range, which extends either from −360° to 0° crankshaft angle or from 360° to 720° crankshaft angle and within which on average a considerably reduced engine torque prevails. If, according to a particularly simple embodiment, the generator is only switched between a switch-on state and a switched-off state in order to vary the generator torque, the generator remains switched off during the first angle range and is switched on during the second angle range.

It is also conceivable to operate the generator as an electric motor, in order to produce negative generator torques that effect an acceleration of the crankshaft. This can be advantageous if negative engine torques that effect deceleration of the crankshaft are present. The negative generator torques can compensate the negative engine torques.

A motor-generator unit according to the invention, which is preferably used in a motor vehicle, is thus characterised by a piston engine with internal combustion and by a generator for electricity generation, which is drive-connected to the piston engine. Furthermore, a control device is provided, which is configured and programmed in such a manner that it carries out the above-described operating method and sets the generator torque depending on the crankshaft angle of a crankshaft of the piston engine. To this end, the control device is connected in a suitable manner both to the piston engine and to the generator. In particular, the control device detects the current rotary position of the crankshaft, in order to vary the generator torque dynamically, that is, within the respective rotation cycle of the crankshaft, depending on the respective crankshaft angle.

The control device can in particular be configured in such a manner that it can carry out the above-explained operating method including the variants mentioned during operation of the motor-generator unit.

Particularly advantageous is an embodiment in which the piston engine is configured as a four-stroke engine and has exactly two pistons for driving the crankshaft, the expansion strokes of said pistons being offset to each other by 180° crankshaft angle. The range-extender formed in this manner is very compact and has only a relatively low weight. The control device then divides the rotation cycle covering 720° crankshaft angle into two equally sized, successive angle ranges of 360° crankshaft angle each. In a first angle range, in which no expansion strokes take place, the control device switches the generator off. In the second angle range that follows directly and in which both pistons execute their expansion strokes, the control device switches the generator on in order to produce a generator torque that counteracts the increased engine torque in a compensating manner. The tendency of the piston engine to oscillate can be reduced significantly thereby with very simple measures.

An electric vehicle according to the invention is equipped with at least one electric motor to drive the vehicle and with a motor-generator unit of the above type to be able to supply the respective electric motor with electricity. In particular, such an electric vehicle comprises at least one rechargeable battery for storing electrical energy, it being possible for said battery and/or the respective electric motor to be supplied with electricity with the aid of the motor-generator unit.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
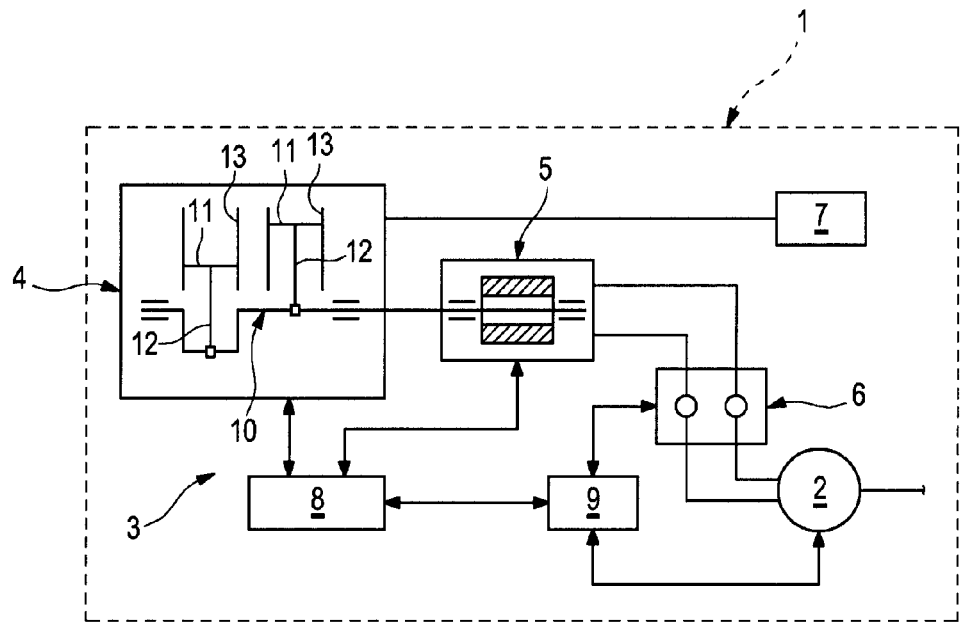
FIG. 1 schematically shows a highly simplified, circuit-diagram-like diagram of a vehicle, FIG. 2 schematically shows a diagram in which an engine torque is plotted for two cylinders over a crankshaft angle, FIG. 3 schematically shows a diagram in which the engine torque is plotted for an engine over the crankshaft angle, FIG. 4 schematically shows a diagram in which an engine speed is plotted over the crankshaft angle, firstly for a constant generator torque and secondly for a dynamic generator torque, FIG. 5 schematically shows a diagram in which a relative generator torque is plotted over the crankshaft angle, firstly for a constant generator torque and secondly for a dynamic generator torque, FIG. 6 schematically shows a diagram in which an average cylinder pressure is plotted over the engine speed for a plurality of different engine torques.

According to FIG. 1, an electric vehicle 1 comprises at least one electric motor 2 for driving the vehicle. The vehicle 1 is also equipped with a motor-generator unit 3, which is used to supply electricity to the electric motor 2. The motor-generator unit 3 comprises a piston engine 4 with internal combustion and a generator 5 for electricity generation, which is drive-connected to the piston engine 4. The vehicle 1 is also equipped with at least one battery 6. The electric motor 2, the battery 6 and the generator 5 are suitably connected to each other in such a manner that electricity can be supplied to the respective electric motor 2 via the battery 6 or via the generator 5 and that the battery 6 can be charged up with the aid of the generator 5. The vehicle thus has a serial hybrid drive.

The vehicle 1 is also equipped with a fuel tank 7 for supplying the piston engine 4 with fuel. The piston engine 4 is not used to drive the vehicle 1, but only to drive the generator 5 so that the drive power of the piston engine 4 can be converted with the aid of the generator 5 into electrical power, which can then be used to supply the electric motor 2 with electricity.

The motor-generator unit 3 also comprises a control device 8, which communicates with both the piston engine 4 and the generator 5. Furthermore, the control device 8 communicates with a vehicle control device 9, which for its parts is suitably coupled to the battery 6 and the respective electric motor 2. It is clear that the control devices 8, 9 can also be connected to further sensors, operating elements and the like.

The piston engine 4 comprises in the usual manner a crankshaft 10, which is drive-connected to at least one piston 11 of the piston engine 4, usually by means of a connecting rod 12. The respective piston 11 is arranged in a stroke-adjustable manner in a cylinder 13 inside the piston engine 4. The piston engine 4 presented here is preferably a two-cylinder in-line engine that operates according to the four-stroke principle. During two complete revolutions of the crankshaft 10, each piston 11 thus successively executes one expansion stroke, one exhaust stroke, one induction stroke and one compression stroke. Each individual stroke covers 180° crankshaft angle. To be able to execute all four strokes in each cylinder 13 or piston 11, the crankshaft 10 must run through a rotation cycle that covers 720° crankshaft angle.

The control device 8 of the motor-generator unit 3 is configured and programmed in such a manner that it can set a generator torque effective at the generator 5 depending on the crankshaft angle of the crankshaft 10 of the piston engine 4, that is, can modify or vary said torque dynamically within the rotation cycle. To this end, the control device 8 can in particular carry out the operating method described below, including the variants mentioned. This operating method is described using a piston engine 4 that has exactly two cylinders in series arrangement and operates according to the four-stroke principle. It is clear that this operating method can also be used in principle for a different number of cylinders and/or for a different arrangement of cylinders and/or for the two-stroke principle.

Figure 2:
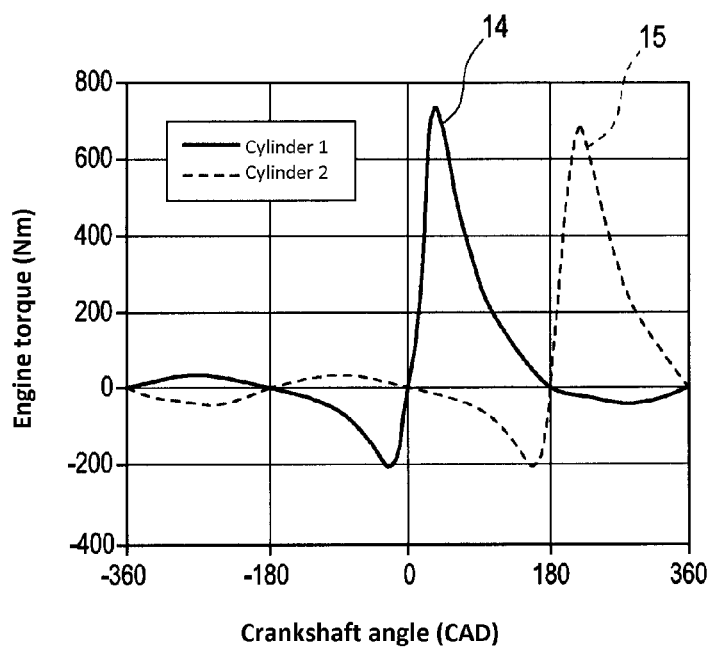

The diagram of FIG. 2 shows with a solid line a first profile 14 of an engine torque, which is transmitted to the crankshaft 10 in a first cylinder 13 with the aid of a first piston 11. A corresponding second profile 15 of a second cylinder 13 or of a second piston 11 is shown with a dashed line. The diagram of FIG. 2 extends in the abscissa over 720° crankshaft angle, that is, over a single rotation cycle of the crankshaft 10. The four strokes of the respective cylinder 13 are divided into four stroke movements of the associated piston 11, which each extend over approximately 180° crankshaft angle. The first profile 14 shows the expansion stroke with a maximum torque transmission to the crankshaft 10 in an angle range from 0° to 180°. This is followed in an angle range of 180° to 360° by an exhaust stroke, in which the associated piston 11 expels the combustion gases produced during combustion from the associated cylinder 13. The respective piston 11 needs force to do this, which is withdraws from the crankshaft 10 in the form of a negative torque. This is followed in an angle range of −360° to −180° by an induction stroke, which produces a slightly positive torque in FIG. 2. Then a compression stroke takes place from −180° to 0°, in which the fresh air sucked in is compressed and which has a comparatively high consumption of torque, that is, a negative torque. The second profile 15 correlates to the first profile 14, but is phase-shifted by 180° in relation to the latter.

Figure 3:
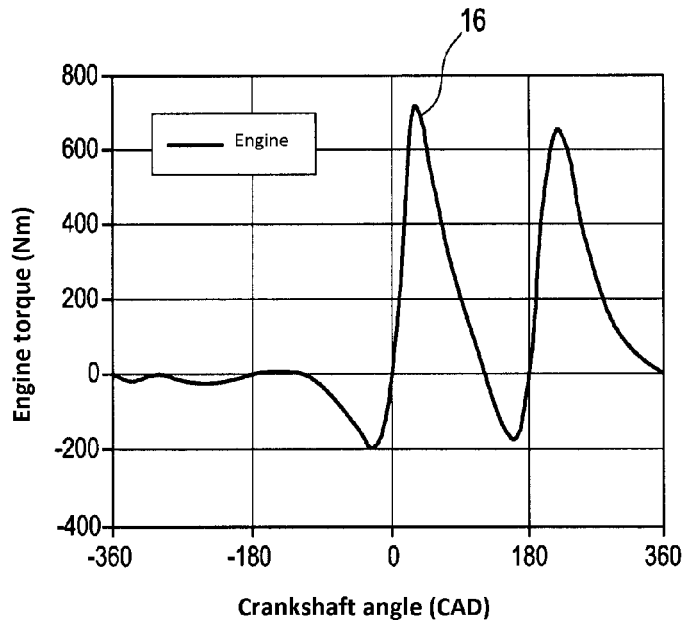

In the diagram of FIG. 3, the two profiles 14, 15 of FIG. 2 are combined to form an overall profile 16, which represents the profile of the engine torque applied to the crankshaft 10 by the piston engine 4. It can be seen that substantially no torque is introduced into the crankshaft 10 in an angle range from −360° to approximately −90°. Strong, positive torques having an accelerating effect are present in angle ranges from 0° to 90° and from 180° to 360°. Relatively high negative torques having a decelerating effect, however, are present in the range from approximately −90° to 0° and 90° to 180°.

Figure 4:
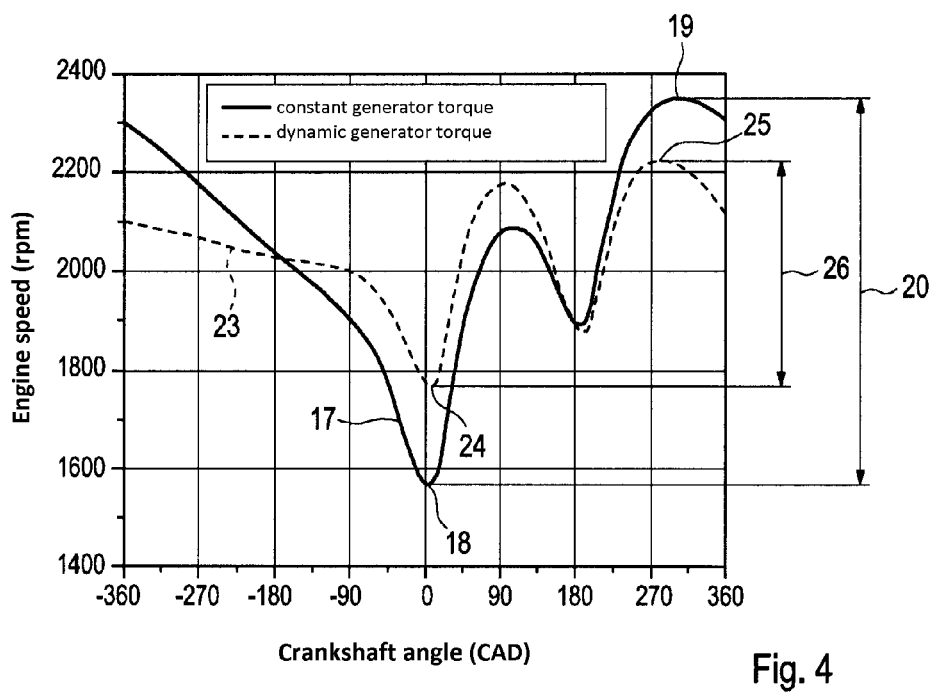

The diagram of FIG. 4 shows with a solid line a profile 17 of an engine speed as a function of the crankshaft angle over an entire rotation cycle. The engine speed corresponds to the rotation speed of the crankshaft 10. It can be seen that the rotation speed of the crankshaft 10 varies within a single rotation cycle. This is attributable to the fact that positive engine torques effect an acceleration of the crankshaft 10, whereas negative engine torques effect a deceleration of the crankshaft 10. If the crankshaft 10 is also drive-connected to the generator 5, a generator torque counteracting the engine torque can also effect a deceleration of the crankshaft 10. Generator torques are also present in the diagram of FIG. 4. A constant generator torque, as is the case in a conventional way of operating such a motor-generator unit 3, is assumed for the profile 17 shown with a solid line. Consequently, deceleration of the crankshaft 10 occurs in the angle range from −360° to −90° owing to the constant generator torque, although in FIG. 3 there is no engine torque in this angle range. In the angle range from −90° to 0° there is strong deceleration of the crankshaft 10 owing to the negative engine torque according to profile 16 of FIG. 3. Then there is strong acceleration of the crankshaft 10 in the angle range from 0° to 90°, which is attributable to the high positive engine torque of the profile 16 in FIG. 3. Then the profile 17 of FIG. 4 drops again briefly in the angle range from 90° to 180°, that is, the rotation speed of the crankshaft 10 decreases somewhat again, which is attributable to the negative engine torque of the profile 16 according to FIG. 3. The rotation speed according to the profile 17 in FIG. 4 then rises sharply again in the angle range from 180° to 360°, which is attributable to the positive torque according to the profile 16 of FIG. 3. This conventional profile 17, which is produced with a constant generator torque, has a minimum at 18 with a minimum rotation speed of the crankshaft 10 and a maximum at 19 with a maximum rotation speed of the crankshaft 10. A difference between minimum 18 and maximum 19 is referred to with 20 in FIG. 4. This difference 20 is comparatively large. This difference 20 occurs within each rotation cycle, as a result of which the crankshaft 10 runs comparatively noisily, so the piston engine 4 has a comparatively high tendency to oscillate and vibrate. This difference 20 in rotation speed is higher, the lower rotation speed of the piston engine 4 and the higher the generator torque effective on the crankshaft 10. This difference in rotation speed becomes greater with decreasing inertia mass of the piston engine 4 or of the entire motor-generator unit 3.

Figure 5:
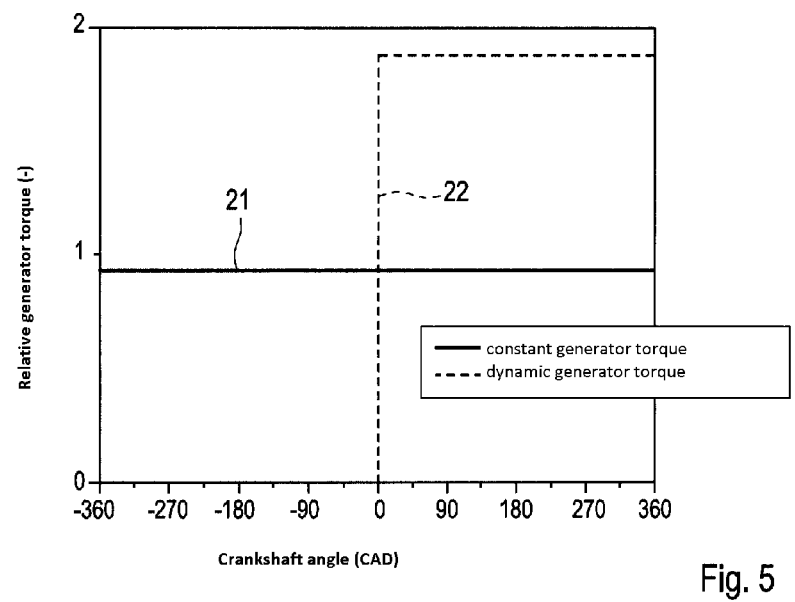

In FIG. 5, a profile 21 of a conventional, constant generator torque is shown with a solid line, which is likewise referred to with 21 below, the ordinate representing a relative generator torque that is therefore related to an average engine torque. The constant generator torque 21 or the constant profile 21 thus has a value close to 1 but below 1. According to the present invention, it is now proposed for the generator torque not to be kept constant within a rotation cycle, but to be varied synchronously, that is, in a manner adapted to the profile 16 of the engine torque within the respective rotation cycle. FIG. 5 shows a particularly simple embodiment, in which the generator 5 is switched off and accordingly produces no generator torque in a first angle range from −360° to 0°, whereas it is switched on and produces a comparatively large generator torque, the value of which is close to 2 but below 2, in an angle range from 0° to 360°. This dynamic profile of the generator torque is shown in the diagram of FIG. 5 with a dashed line and referred to with 22, the dynamic generator torque itself also being referred to with 22 below.

Returning to FIG. 4, this dynamic generator torque 22 is used during operation of the motor-generator unit 3. The resulting profile for the rotation speed of the crankshaft 10 is shown in the diagram of FIG. 4 with a dashed line and referred to with 23. It can be seen that the rotation speed falls again in the angle range from −360° to 90°, but not as greatly as in the profile 17 with constant generator torque 22 according to the constant profile 22 in FIG. 5. This attributable to the fact that, according to the dynamic profile 22 in FIG. 5, there is no generator torque that could have a slowing effect on the crankshaft 10 within this angle range. The fact that the engine speed and the rotation speed of the crankshaft 10 decreases nevertheless is largely attributable to the friction effects. In the angle range from −90° to 0°, the engine speed falls further, but not as greatly as in the case of a constant generator torque 21. This is because only the negative engine torque according to the profile 16 of FIG. 3 is effective here, whereas there is still no generator torque according to the dynamic profile 22 in FIG. 5. The engine speed increases in the angle range from 0° to 90°, which is attributable to the high positive engine torque according to profile 16 in FIG. 3. However, the rise in rotation speed is not as great as in the profile 17 with constant generator torque 21. This is attributable to the fact that according to the dynamic profile 22 in FIG. 5, the dynamic generator torque 22 is selected to be approximately twice the constant generator torque 21 according to the profile 21 in FIG. 5. Another deceleration owing to the negative engine torque in the profile 16 of FIG. 3 then follows in the profile 23 of the engine speed in the angle range from 90° to 180°. This deceleration is more pronounced in the profile 23 with the dynamic generator torque 22 than in the profile 17 with constant generator torque 21. This is because the decelerating generator torque is much greater than, namely approximately twice the constant generator torque 21. The engine speed increases again in the angle range from 180° to 360°, which is attributable to the positive engine torque in the profile 16 in FIG. 3. In this case too, the increase in rotation speed in the profile 23 with dynamic generator torque 22 is weaker than in the profile 17 with constant generator torque 21, which is attributable to the approximately double negative or decelerating generator torque according to the profile 22.

As can be seen in FIG. 4, the profile 23 of the rotation speed with dynamic generator torque 22 has a minimum at 24 with a minimum engine speed and a maximum at 25 with a maximum engine speed. This again produces a rotation speed difference 26 for the profile 23 with dynamic generator torque 22, which is significantly smaller than the rotation speed difference 20 of the profile 17 with constant generator torque 21. Consequently, the tendency of the piston engine 4 or the entire motor-generator unit 3 to oscillate and vibrate is significantly reduced. Since, according to the embodiment discussed here, the dynamic generator torque 22 over half the rotation cycle is twice as high as the constant generator torque 21 that extends over the entire rotation cycle, the power yield in both cases is approximately equal.

Figure 6:
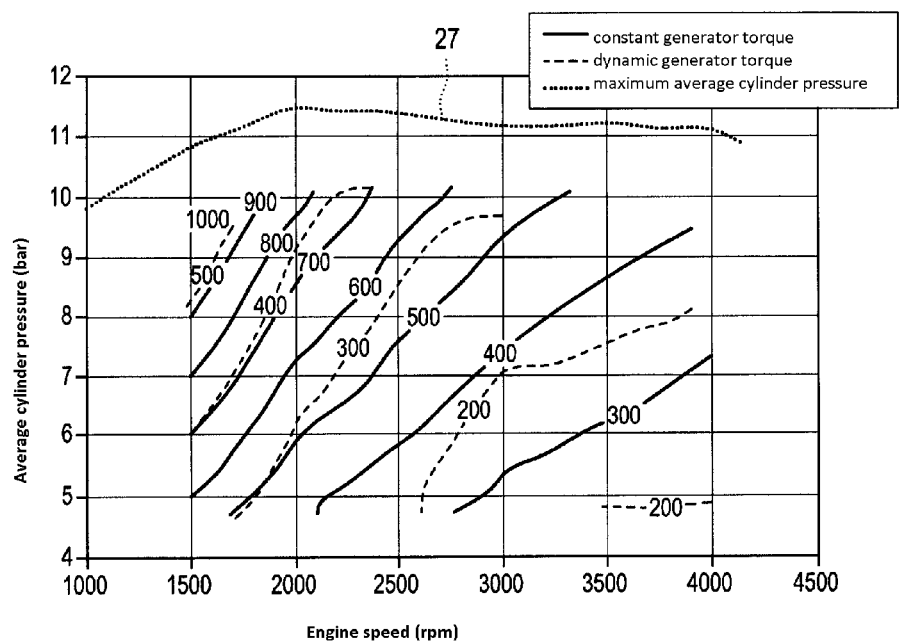

In FIG. 6, the average cylinder pressure is plotted purely by way of example over different engine speeds, a plurality of different profiles being reproduced, which are set with different engine loads, that is, with different power demands at the generator 5. The solid lines again correspond to profiles that are set with a constant generator torque 21. In contrast, profiles that are set with a dynamic generator torque 22 are shown with dashed lines. The individual profiles are characterized by numerical values 200, 300, 400, 500, 600, 700, 800, 900, 1000 that are intended to represent different load situations. Overall, it can be seen in the diagram that the above-described smoothing of the rotation speed profile of the crankshaft 10 within the respective rotation cycle can be realised substantially in the entire characteristic field of the piston engine 4, that is at different rotation speeds and in different load situations. In the diagram of FIG. 6, a profile 27 is also shown with a dotted line, which represents the maximum settable average cylinder pressure as a function of the engine speed.

In the method according to the invention, the generator torque 5 can thus be increased when the engine torque increases and reduced when the engine torque decreases within the respective rotation cycle. In the exemplary embodiment shown here, which is particularly simple to implement, the generator 5 is switched on to increase the generator torque, whereas the generator 5 is switched off to reduce the generator torque. It is clear that better dynamic adaptation of the generator torque to the profile of the engine torque can also be realised, in particular at lower rotation speeds of the crankshaft 10. It is in particular conceivable that a plurality of different generator torques that are different from zero can be produced to be able to follow the profile 16 of the engine torque better overall.

To increase the generator torque, for example an electrical power output by the generator 5 can be increased. To reduce the generator torque, for example an electrical power output by the generator 5 can however be reduced.

As can be seen by comparing FIGS. 2 and 3, an increased engine torque is present especially when one of the pistons 11 executes an expansion stroke.

In the example shown here, a first angle range is present within the respective rotation cycle, which in this case extends from −360° to 0° crankshaft angle and in which an on average reduced engine torque is present. A second angle range extends then from 0° to 360° crankshaft angle. In this second angle range a higher engine torque is present. According to FIG. 5, the generator torque is reduced, in particular by switching off the generator 5, in the first angle range, whereas the generator torque is increased, namely in particular by switching on the generator 5 and loading the generator 5 with a constant demand for electricity, in the second angle range, as a result of which a constant generator torque is produced at the generator 5.

However, it can expediently also be provided for the generator torque to be varied within the respective rotation cycle according to the profile 16 of the engine torque. In the case of the two maxima in profile 16 of the engine torque according to the diagram of FIG. 3, it is conceivable for each of these two maxima to be assigned a separate generator torque.

It is in particular also conceivable for positive sections in the profile 16 of the engine torque to be assigned a comparatively high generator torque. With engine torques that lie in the region of zero in the profile 16, the generator torque can likewise be set to zero. In ranges of the profile 16 in which the engine torque is negative, the generator torque can likewise be set to zero. According to a specific embodiment, it is likewise conceivable for negative generator torques also to be produced in said ranges with negative engine torque, by temporarily operating the generator 5 as an electric motor, the drive torque of which drives, that is, accelerates the crankshaft 10. This measure means that the drops in rotation speed during the compression strokes of the individual cylinders 13 and pistons 11 can be further reduced. The electrical energy needed for this can be compensated by an increased generator moment in the phases of particularly high engine moments, that is, by an increased power yield in said phases.

The invention claimed is:

1. An electric vehicle, comprising:
   at least one electric motor configured to transmit a drive output;
   a motor-generator unit configured to supply the at least one electric motor with an electrical output; and
   at least one battery;
   wherein the motor-generator unit includes:
      an internal combustion piston engine including a crankshaft configured to rotate about an axis of rotation;
      an electrical generator drive-connected to the piston engine; and
      a control device in communication with the motor-generator unit, wherein the control device is configured to vary a generator torque of the electrical generator during a rotation cycle of the crankshaft in response to a crankshaft angle of the crankshaft;
   wherein the piston engine is configured as a four-stroke engine, in which the rotation cycle corresponds to a rotation encompassing a 720° crankshaft angle, the piston engine including two pistons for driving the crankshaft, the two pistons each defining an expansion stroke which are phase-shifted with respect to each other by a 180° crankshaft angle;
   wherein the control device is configured to associate the rotation cycle of the crankshaft with a first angle range having a first engine torque that is reduced on average in relation to a predetermined engine torque and a second angle range having a second engine torque that is higher on average in relation to the predetermined engine torque;

wherein the control device provides no generator torque during the first angle range and increases the generator torque during the second angle range; and wherein the electrical generator, the at least one electric motor, and the at least one battery are connected to each other in such a manner that electricity is suppliable to the at least one electric motor via the at least one battery or the electrical generator.

2. The vehicle according to claim 1, wherein the control device activates the electrical generator to increase the generator torque and deactivates the electrical generator to provide no generator torque.

3. The vehicle according to claim 2, wherein the electrical generator increases an electrical power output in response to being activated.

4. The vehicle according to claim 2, wherein the control device is configured to associate an increased engine torque with the rotation cycle during the expansion stroke of at least one of the pistons of the piston engine, wherein the increased engine torque is determined in relation to the predetermined engine torque.

5. The vehicle according to claim 2, wherein the control device is configured to provide no generator torque in response to detecting a negative engine torque.

6. The vehicle according to claim 1, wherein the control device is configured to increase an electrical power output via the electrical generator to increase the generator torque.

7. The vehicle according to claim 6, wherein the control device is configured to associate an increased engine torque with the rotation cycle during the expansion stroke of at least one of the pistons of the piston engine, wherein the increased engine torque is determined in relation to the predetermined engine torque.

8. The vehicle according to claim 7, wherein the control device is configured to provide no generator torque in response to detecting a negative engine torque.

9. The vehicle according to claim 6, wherein the respective expansion strokes of the two pistons occur exclusively during the second angle range.

10. The vehicle according to claim 9, wherein the control device is configured to activate the electrical generator during the second angle range to increase the generator torque.

11. The vehicle according to claim 1, wherein the control device is configured to associate an increased engine torque with the rotation cycle during the expansion stroke of at least one of the pistons of the piston engine, wherein the increased engine torque is determined in relation to the predetermined engine torque.

12. The vehicle according to claim 11, wherein the control device is configured to activate the electrical generator during the second angle range to increase the generator torque and deactivate the electrical generator during the first angle range to provide no generator torque.

13. The vehicle according to claim 1, wherein the control device is configured to provide no generator torque in response to detecting a negative engine torque.

14. The vehicle according to claim 1, wherein the control device is configured to associate the respective expansion strokes of the two pistons with the second angle range, and associate the first angle range with an absence of the respective expansion strokes.

15. The vehicle according to claim 14, wherein the control device is configured to activate the electrical generator to increase the generator torque during the second angle range and deactivate the electrical generator to provide no generator torque during the first angle range.

16. The vehicle according to claim 1, wherein the generator torque is constant during at least one of the first angle range and the second angle range.

17. The vehicle according to claim 1, wherein the respective expansion strokes of the two pistons only occur within the second angle range, whereas no expansion strokes occur in the first angle range.

18. The vehicle according to claim 1, wherein the drive output is exclusively transmitted via the at least one electric motor.

19. An electric vehicle, comprising:
at least one electric motor configured to transmit a drive output;
at least one battery;
a motor-generator unit operatively coupled to the at least one electric motor and configured to supply the at least one electric motor with electrical power, the motor-generator unit including:
an internal combustion piston engine including a crankshaft configured to rotate about an axis of rotation; and
an electrical generator drive-connected to the piston engine; and
a control device in communication with the motor-generator unit, the control device configured to:
determine a crankshaft angle of the crankshaft;
vary a generator torque of the electrical generator during a rotation cycle of the crankshaft in response to the crankshaft angle, wherein the rotation cycle corresponds to a rotation encompassing a 720° crankshaft angle;
associate the rotation cycle of the crankshaft with a first angle range having a first engine torque that is reduced on average in relation to a predetermined engine torque and a second angle range having a second engine torque that is higher on average in relation to the predetermined engine torque; and
actuate the electrical generator in response to the crankshaft angle, wherein the electrical generator outputs no generator torque during the first angle range and a constant, increased generator torque in relation to the predetermined generator torque during the second angle range;
wherein the electrical generator, the at least one electric motor, and the at least one battery are connected to each other in such a manner that electricity is suppliable to the at least one electric motor via the at least one battery or the electrical generator.

20. The vehicle according to claim 1, wherein the first angle range is from −360 degrees to zero degrees, the second angle range is from zero degrees to 360 degrees, and the first engine torque is substantially zero from −360 degrees to approximately −90 degrees in the first angle range.

* * * * *